May 3, 1955  O. C. MONTGOMERY  2,707,524
SEISMIC RECORDING SYSTEM
Filed July 31, 1950
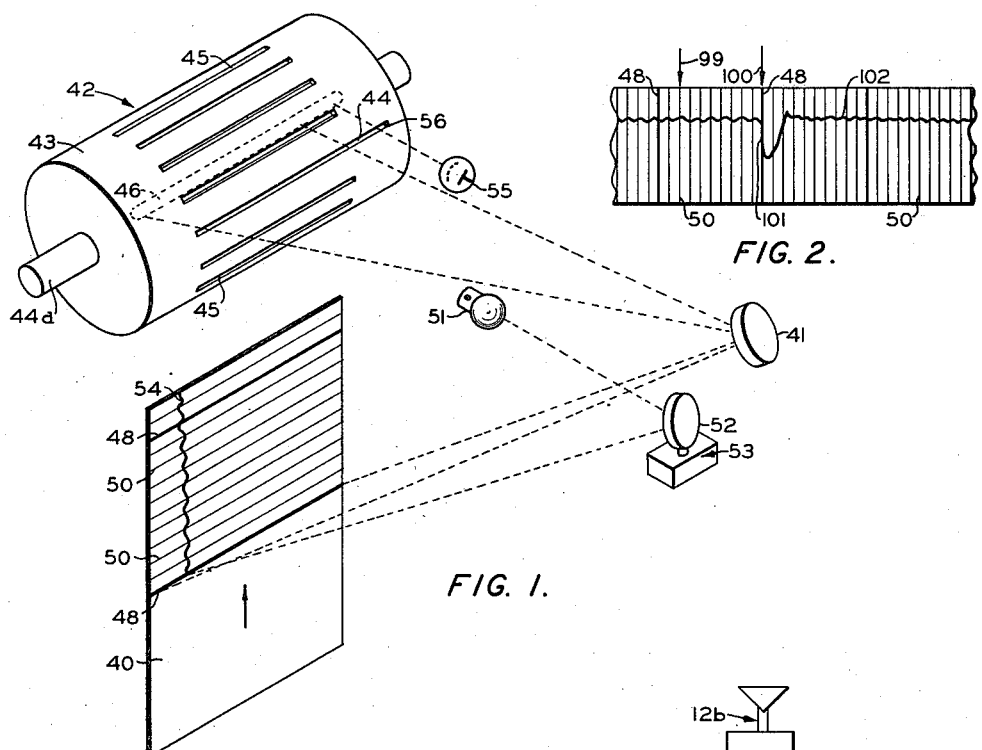
FIG. 2.
FIG. 1.
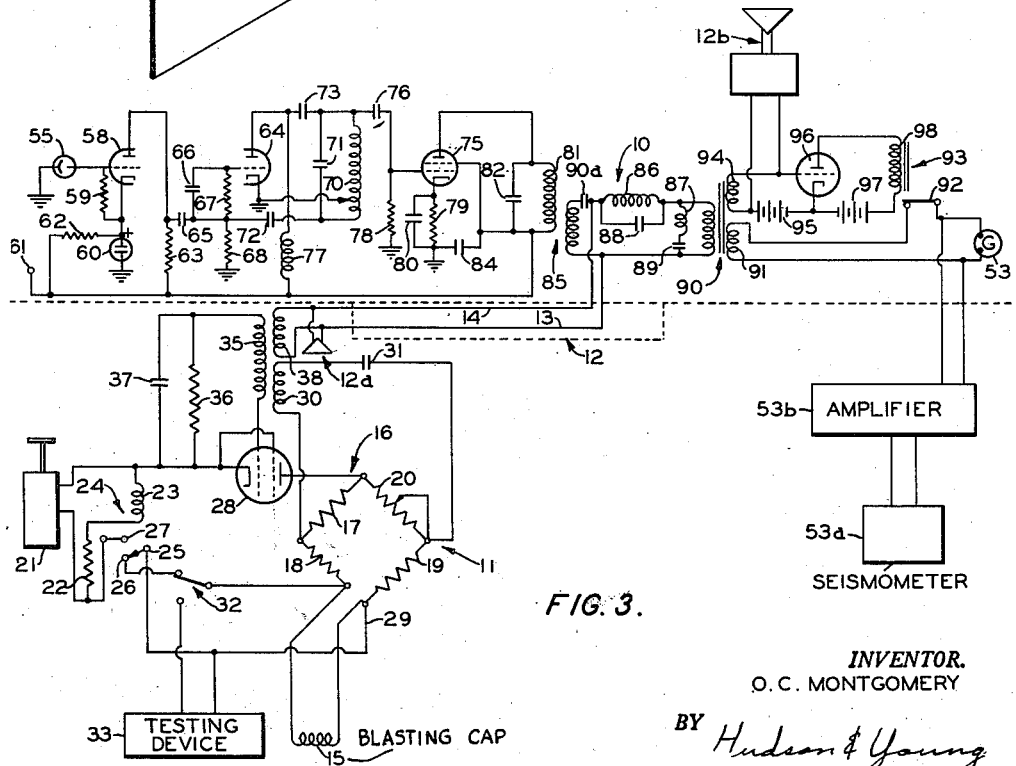
FIG. 3.
INVENTOR.
O. C. MONTGOMERY
BY *Hudson & Young*
ATTORNEYS

United States Patent Office 2,707,524
Patented May 3, 1955

2,707,524

SEISMIC RECORDING SYSTEM

Orin C. Montgomery, Bartlesville, Okla., assignor to Phillips Petroleum Company, a corporation of Delaware Application July 31, 1950, Serial No. 176,892

19 Claims. (Cl. 181—0.5)

This invention relates to a system for indicating the time of occurrence of an explosion upon a record. In one specific aspect, it relates to a system for producing a blasting cap firing impulse coincident with the production of a timing line upon a recording medium. In another specific aspect, it relates to a circuit for detonating a blasting cap at a particular part of a time interval.

In seismic prospecting, a charge of dynamite or other explosive material is detonated at a location, referred to as the shot point, by an electrically actuated blasting cap which, ordinarily, comprises a resistance wire adapted to be heated by passage of a current of predetermined magnitude therethrough. The detonation of the charge produces seismic waves, a portion of which traverse the surface of the earth to a number of seismometer stations where they are picked up and converted into electrical voltages representative thereof by the seismometers. Other seismic waves are reflected and refracted from subterranean strata and their arrival time at the seismometers with respect to the shot time yields valuable information concerning the structure of the subterranean formations. In general, the output of the seismometers is recorded upon a common tape or recording medium, and the time taken for the wave to reach the seismometer from the shot point is determined by measuring the distance from the time break (i. e., the shot time), to the event of interest upon the seismometer record. It is, therefore, essential that the recording medium provide an accurate indication of the exact time at which the detonation occurred. The necessity for accuracy will be evident from consideration of the fact that the arrival times of all seismic waves at the seismometer stations will be in error if the shot time is, in fact, slightly different than that shown on the recording medium.

In making seismic records, a series of timing lines are formed upon the medium by optical apparatus, and it is very desirable that the time break be located upon a predetermined one of these lines which can be considered the point of zero time or time reference. This avoids the necessity of subtracting the distance between the time break and the time reference in measuring the distance between the time break and each seismic reflection upon the medium. Further, in seismic work, it is very desirable to utilize a minimum number of cables or conductors extending between the seismometers, the shot point, and the recording station.

It is an object of my invention to provide apparatus for causing detonation of the charge at a precise predetermined instant of time so that the record of the explosion or time break appears upon a definite timing line of the recording medium.

It is a further object to provide such apparatus in which only two conductors need be provided between the shot point and the recording station.

It is a still further object to provide apparatus in which the explosion is initiated by a radio frequency impulse passing over a two conductor transmission line, this impulse causing detonation of the blasting cap upon supply of suitable blasting current by a generator, the resulting detonation producing an electrical pulse which passes to the recording station over the same transmission line and is there recorded.

It is a still further object to provide an improved apparatus for detonating an explosive charge at a given instant of time.

It is a still further object to provide a system in which the triggering impulse is derived from the optical system utilized to produce timing lines upon the recording medium.

Various other objects, advantages and features of the invention will become apparent from the following detailed description taken in conjunction with the accompanying drawings, in which:

Figure 1 is a perspective view of an optical system for a recorder utilizing the principles of this invention;

Figure 2 is a view of a typical recorder tape showing the time break; and

Figure 3 is a schematic circuit diagram of the electrical circuit of my invention.

Referring now to the drawings in detail and particularly to Figure 3, the circuit is divided into a portion 10 located at a recording station and a portion 11 located at the shot point, these electrical circuits being connected by a cable 12 incorporating two conductors 13 and 14.

In a preferred embodiment of the invention, a blasting cap 15 of the electrical resistance type is disposed in one arm of a Wheatstone bridge 16 defined by fixed resistors 17, 18 and 19 together with a variable balancing resistor 20, this bridge being constructed in accordance with Patent 2,470,846 to D. R. de Boisblanc and J. E. Bondurant, issued May 24, 1949. Blasting current is supplied to the bridge circuit by a generator 21, preferably of the hand-actuated type, the output of the generator being fed through a fixed resistance 22 to an energizing winding 23 of a relay 24, this relay having an armature 25 which is normally engageable with a contact 26, the armature moving out of engagement with contact 26 and into engagement with a contact 27 when the winding is energized by a voltage of sufficient magnitude as to supply proper blasting current to the cap. Thus, the relay 24 may be considered to have a set of normally closed contacts 25, 26 together with a set of normally open contacts 25, 27. It will be noted that the output leads of generator 21 are also connected to the cathode of a gas tube 28 and to the contact 27. The anode of tube 28 and a lead 29 secured to the relay armature 25 are connected to two opposite terminals of the bridge 16, the other opposite terminals being connected in circuit with a transformer winding 30 and an isolating condenser 31 for a purpose to be hereinafter explained. The bridge circuit can, in some cases, be replaced by a direct connection of the generator to the blasting cap.

The relay contact 26 is connected to one fixed contact of a switch 32, the arm of which is connected to the junction between blasting cap 15 and bridge resistor 18. A testing device 33 has one terminal thereof connected to the conductor 29 and its other terminal connected to a second fixed contact of switch 32. The testing device 33 is preferably of the type shown in Patent 2,492,459 to J. E. Bondurant issued December 27, 1949. It will be evident that this testing device is connected in circuit when switch 32 is moved to its lower position and disconnected from the circuit when this switch is in its upper position.

The control grid of gas tube 28 is connected to the cathode thereof through a winding 35 and a resistance 36 of low ohmic value shunted by a condenser 37 of high capacitance, these latter components forming a grid leak system to provide grid bias for tube 28. The windings 30, 35 are inductively coupled to a winding 38 connected to the conductors 13 and 14. It will be further noted that gas tube 28 has a suppressor grid which is attached directly to the cathode of the tube.

In the operation of the circuit as thus far described, and assuming switch 32 to be in its upper position, the tube 28 is non-conductive since no anode-cathode potential is supplied thereto by generator 21. At this stage, the bridge circuit is balanced by proper adjustment of variable resistor 20 and the blasting cap 15 is short circuited by engagement of relay armature 25 with normally closed contact 26. As a result, the blasting cap cannot be accidentally detonated by stray currents.

When it is desired to fire the explosive charge, generator 21 is actuated and a voltage builds up across relay winding 23. When this voltage reaches a value sufficient to operate the blasting cap 15, relay 24 is energized to open contacts 25, 26 and close contacts 25, 27. As a result, two opposite terminals of the bridge are connected in series with the contacts 25, 27, the generator 21 and the gas tube 28. However, no current flows through the bridge since the tube 28 is non-conductive. Thereupon, a control impulse, preferably a short radio frequency wave train is fed through windings 38, 35 from the cable 12 to the control grid of tube 28. The tube immediately becomes conductive with the result that current flows through the two branches of bridge circuit 16, thereby causing blasting cap 15 to be rapidly heated and detonated practically instantaneously.

When the circuit at blasting cap 15 is broken due to detonation of the explosive charge, the bridge 16 becomes unbalanced with the result that a pulse of current passes through condenser 31 to winding 30. As a result of the inductive coupling between windings 30, 38, this pulse is transmitted over the cable 12 by way of conductors 13 and 14, this pulse being produced at the exact shot instant. After the charge is fired, generator 21 ceases to supply current and the circuit returns to its initial condition and is ready for insertion of a new blasting cap and subsequent detonation of a charge.

In summary, therefore, when generator 21 is actuated, a control impulse passing from the cable to the shot point station causes a practically instantaneous detonation of the charge and produces a signal for transmission back to the recording station over the same transmission line to provide a record of the exact shot instant.

In accordance with the invention, the timing impulse supplied to the shot hole apparatus 11 coincides in time with a predetermined timing line produced upon a recording medium by the apparatus of Figure 1. In this figure, a movable light-sensitive recording medium or tape 40 has a beam of light focused upon it by a mirror 41 which, in turn, receives an interrupted light beam from timing apparatus 42. This timing apparatus preferably includes a generally cylindrical drum 43 rotatable with a shaft 44a which may, if desired, be surrounded by a slotted stationary cylinder, not shown. This drum is provided with an elongated longitudinal slot 44 of relatively wide dimensions together with a series of shorter, more narrow longitudinal slots 45 spaced circumferentially, at equal intervals, about the periphery of the drum. Mounted axially within the drum 43 is an elongated filament 46 which causes an elongated beam or pencil of light to impinge upon mirror 41 when one of the slots 44 or 45 is positioned between the filament and mirror, this beam being reflected upon the recording tape 40 by the mirror. When the recording medium moves, for example, in an upward direction, and the drum 43 is rotated at a constant rate of speed, a series of relatively wide timing lines 48 are produced upon the tape by successive passage of slot 44 between the filament and mirror. Furthermore, a series of relatively narrow timing lines 50 are provided between each adjacent pair of timing lines 48 by the successive passage of slots 45 between the filament and mirror. Conveniently, there are nine such timing lines 50 for each timing line 48 to facilitate decimal estimation of the distance between the lines.

The optical system of Figure 1 also includes a light source 51 producing a beam of light which is reflected onto the tape 40 by a mirror 52 forming a part of a recording galvanometer 53. This light source and galvanometer produce a trace 54 upon the recording medium as it moves in an upward direction during the recording period. In the present embodiment of the invention, galvanometer 53 is utilized to record the exact time of the detonation of the explosive charge, as will hereinafter become apparent. The recording unit also includes a number of similar light sources 51 and recording galvanometers which are fed by the respective seismometers producing electrical voltages representative of the seismic waves incident thereupon. These recording galvanometers produce traces upon the tape in the usual manner but are not shown on the present drawing for purposes of simplicity.

In accordance with the invention, a photoelectric cell 55, or other photo-sensitive element, is positioned adjacent the drum 43 so that it receives a light beam when the elongated end portion 56 of slot 44 passes between filament 46 and the cell. The cell is so positioned that no light is incident thereupon as the slots 45 pass between the filament and mirror 41. Thus, the cell 55 receives light radiation and becomes conductive each time the slot 44 passes between filament 46 and mirror 41 which, as stated, is coincident with the production of a broad timing line 48 upon the recording medium 40.

The described change in conductivity of cell 55 is utilized to produce a control impulse, preferably a short train of radio frequency waves, which is fed over transmission line 12 to the control grid of gas tube 28 to cause said tube to become conductive in the manner already described. To this end, the cell 55 is connected between the control grid of an amplifier tube 58, Figure 3, and ground. The cathode of this tube is connected to the control grid through a resistor 59, to ground through a voltage regulator tube 60, and to a positive power supply terminal 61 through a fixed resistance 62. Further, the anode of tube 58 is connected to positive power supply terminal 61 by a resistance 63.

As a result, a predetermined positive voltage is maintained at the cathode of tube 58 which is slightly less than that existing at the anode of the tube. When photoelectric cell 55 becomes conductive, current flows therethrough and produces a decrease in voltage at the control grid, thereby producing a positive pulse in the anode circuit of the tube. This pulse is transmitted to the control grid of an oscillator tube 64 by a network which includes coupling condensers 65, 66 and a pair of series connected fixed resistances 67, 68 connected between the control grid of tube 64 and ground, it being noted that the junction between condensers 65, 66 is connected to the junction between the resistances 67, 68. The cathode of tube 64 is grounded and it is also connected to a tap upon a coil 70, shunted by a condenser 71. One terminal of the coil is connected through a condenser 72 to the junction between resistances 67 and 68, the other terminal of the coil being connected to the anode of tube 64 by a coupling condenser 73 and to the control grid of an amplifier tube 75 by a coupling condenser 76. The anode of tube 64 is also connected to positive supply terminal 61 through a radio frequency choke 77.

When a positive pulse from tube 58 is applied to the control tube of oscillator tube 64, this latter tube becomes conductive and sets up an oscillation at a frequency determined by the inductance-capacitance relationship of the components 70, 71, a portion of the oscillatory energy being fed back to the control grid by coupling condenser 72 to maintain the circuit in oscillation until positive pulse is terminated, at which time the tube 64 again becomes non-conductive and the oscillation stops. Accordingly, the application of a positive pulse to the control grid of tube 64 produces a control impulse at the grid of tube 75, this impulse consisting of a short train of radio frequency waves.

The tube 75 is a radio frequency amplifier and, to this end, the control grid thereof is connected to ground through a resistor 78, the cathode is connected to ground through a resistance 79 shunted by a bypass condenser 80 and the anode of the tube is connected to one terminal of an inductance 81 which is shunted by a condenser 82, the other terminal of the inductance-capacitance unit thus formed being connected to terminal 61 and through a condenser 84 to ground. The function of the tube 75 is to amplify the train of radio frequency energy produced by oscillator tube 64.

It will be evident, therefore, that the passage of slot 44 between filament 46 and photoelectric cell 55 produces a pulse of radio frequency energy in inductance 81 which occurs practically simultaneously with the production of a wide timing line 48 upon the recorder chart. This pulse is fed through transmission line 12 by virtue of a winding 85 inductively coupled to winding 81 and connected to the conductors 13 and 14 so that the described radio frequency impulse passes through the transmission line and causes the control grid of tube 28 to become positive.

The apparatus at the recording station also includes a circuit for recording the pulse of energy produced when blasting cap 15 is detonated with resultant abrupt unbalancing of the bridge 16. This pulse, which occurs at the exact instant of detonation, is transmitted through the transmission line 12 from inductively coupled windings 30, 38 and passes through a filter consisting of inductances 86, 87 together with filter condensers 88 and 89 to the primary winding of a transformer 90. The purpose of the filter is to prevent the transmission of radio frequency impulses from winding 81 to the recording circuit now to be described. A condenser 90a provides a low impedance for radio frequency signals from winding 81 and a high impedance for the pulses produced by detonation of cap 15. This circuit includes a secondary winding 91 of transformer 90 which is connected in circuit with the recording galvanometer 53 and a set 92 of normally closed contacts forming a part of a relay 93. The radio frequency pulse appearing at winding 81 is not recorded by galvanometer 53 due to the filter interposed in the circuit between these components but the pulse produced by detonation of the blasting cap passes through the transmission line and filter to the transformer 90 and galvanometer 53.

The transformer 90 is provided with another secondary winding 94 which, together with a battery 95, is connected in the control grid-cathode circuit of a gas tube 96. The anode-cathode circuit of this tube incorporates a battery 97 and an energizing winding 98 of relay 93. Accordingly, when a pulse passes through transformer 94, tube 96 becomes conductive and energizes relay 93, thereby opening contacts 92 and preventing further operation of galvanometer 53 by pulses transmitted over line 12 after the time break impulse has been recorded. The galvanometer 53 can be subsequently energized by a seismometer 53a and amplifier 53b. Cable 12 can also carry voice signals between a telephone station 12a and 12b.

In the overall operation of the circuit, the explosive charge and blasting cap are so regulated and tested as to be in readiness for detonation, thereby to produce seismic waves to be picked up at the several seismometer stations. Thereupon, movement of tape 40 and rotation of drum 43 are initiated. The operator at the shot point then manipulates generator 21 to supply blasting current to the bridge circuit. When the voltage becomes high enough to cause detonation of the cap 15, relay 24 is actuated to close contacts 25, 27 and supply anode potential to gas tube 28. For purposes of explanation, it is assumed that the actuation of relay 24 occurs at a time between the production of two heavy timing lines 48 on the chart, as indicated by arrow 99. The described actuation of relay 24 does not effect firing of the charge, however, since the grid potential of gas tube 28 is such that the tube is non-conductive.

Rotation of drum 43 then continues with resultant production of narrow timing lines 50 upon the chart until slot 44 is interposed between filament 46, mirror 41 and photoelectric cell 55. When this occurs, a heavy timing line 48 designated by arrow 100 on Figure 2 is produced, and a light beam is incident upon cell 55, thus actuating oscillator 64 to produce a radio frequency control impulse which is transmitted through amplifier 75 and transmission line 12 to the control grid of gas tube 28. This latter tube immediately becomes conductive and allows blasting current to flow through the bridge circuit and detonate cap 15. The detonation of the cap produces an abrupt unbalance of bridge 16 which causes a pulse to be transmitted through windings 30 and 38, transmission line 12, and transformer 90 to the recording galvanometer 53. This produces an abrupt deflection of the galvanometer resulting in a sharp time break impulse 101 upon the recorder tape, this impulse indicating the exact time of the detonation of the charge and being positioned at the broad timing line 48 indicated by arrow 100. The pulse fed to galvanometer 53 also actuates tube 96 and relay 93 to disconnect the galvanometer 53 from transmission line 12 immediately after the time break impulse has been recorded.

Thus, the remainder of the trace after the recording of time break impulse 101 consists merely of a straight line 102, unless a seismometer is also connected to galvanometer 53 in the manner previously indicated.

It will be understood that a slight adjustment of the position of mirror 41 may be necessary in some cases to compensate for the time delay occurring between energization of the cell and firing of the blasting cap.

It will be apparent that numerous important advantages are realized from the circuit and optical system of my invention. The time break impulse is accurately located upon a broad timing line 48 which greatly facilitates the computation of the arrival time of subsequent seismic waves recorded on the tape, since this broad timing line is used as the time reference. Customarily, there are nine narrow timing lines 50 between each set of broad timing lines so that computation of the arrival times by the decimal system is greatly facilitated. The provision of the radio frequency impulse-generating circuit permits the energizing impulse for tube 28 and the time break signal produced by detonation of cap 15 to be transferred over a single pair of conductors 13 and 14. This is quite important, since a substantial distance ordinarily separates the shot point and the recording station. Furthermore, the optical system including the elongated slot 44 and the shorter slots 45 permits the firing mechanism to be actuated by an impulse proceeding very directly from the optical system for producing the timing lines. Thus, there is no danger of extraneous time delays resulting from mechanical linkages or contacts actuated by the drum-driving mechanism. The circuit associated with secondary winding 94 causes the galvanometer 53 either to be disabled or connected to seismometer 53d immediately after the time break has been recorded, thus preventing confusion of the time break record with the other traces produced upon the tape by the seismometers. Finally, the relay 24 prevents firing of the cap until a proper blasting voltage has been produced by the generator and has an added safety feature in that the cap is electrically short circuited prior to the time the proper electrical voltage is produced by the generator, this relay operating in conjunction with switch 32 to permit testing of the cap as desired by the device 33.

While the invention has been described in connection with present preferred embodiments thereof, it is to be understood that this description is illustrative only and

I claim:

1. A system for indicating the time break upon a seismic record which comprises, in combination, means for producing spaced timing lines upon a recording medium, means for producing an impulse of light coincident in time with the production of certain of said timing lines, an electrically actuated blasting cap, means for producing blasting current for detonating said cap, means responsive to said light impulses to supply said blasting current to said cap, means for producing an electrical pulse when said cap is detonated, and means for recording said pulse upon said medium.

2. A system for indicating the time break upon a seismic record which comprises, in combination, means for producing spaced timing lines upon a recording medium, means for producing a radio frequency impulse coincident in time with the production of certain of said timing lines, an electrically actuated blasting cap, a generator for producing blasting current for detonating said cap, a relay for preventing passage of said current to said cap until the voltage produced by said generator reaches a predetermined value, means permitting blasting current to flow through said cap only when a radio frequency impulse is produced by said impulse producing means, means for producing an electrical pulse when said cap is detonated, and means for recording said pulse upon said medium.

3. A system for indicating the time break upon a seismic record which comprises, in combination, apparatus at a shot point including an electrically actuated blasting cap, a generator for supplying blasting current to said cap, and a relay device connected in circuit with said generator and cap, said device preventing actuation of said cap when deenergized and permitting actuation of said cap when energized, and apparatus at a recording station including an optical device for producing spaced timing lines upon a recording medium, means for producing impulses of light coincident with the production of selected ones of said timing lines, means for converting said impulses of light into electrical impulses, and means for feeding said electrical impulses to said relay device to energize said device.

4. A system for indicating the time break upon a seismic record which comprises, in combination, apparatus at a shot point including an electrically actuated blasting cap, a generator for supplying blasting current to said cap, a relay having an actuating winding connected to said generator and a set of normally open contacts, said relay being actuated to close said contacts when the generator voltage rises above a predetermined value, a gas tube having an anode, a cathode and a control grid, leads connecting the anode and cathode of said tube in circuit with said generator, said contacts and said blasting cap, whereby the cap is detonated when said relay is actuated and said tube becomes conductive, and apparatus at a recording station including an optical device for producing spaced timing lines upon a recording medium, means for producing an impulse of radio frequency current coincident with the production of selected ones of said timing lines, and means for feeding said radio frequency impulses to said control grid, whereby said tube becomes conductive when said relay is energized and an impulse is applied to the control grid, thereby to effect detonation of said blasting cap.

5. A system for indicating the time break upon a seismic record which comprises, in combination, apparatus at a shot point including an electrically actuated blasting cap, a generator for supplying blasting current to said cap, a relay device connected in circuit with said generator and cap, said device preventing actuation of said cap when deenergized and permitting actuation of said cap when energized, and means for producing a pulse of current when said cap is detonated, and apparatus at a recording station including an optical device for producing spaced timing lines upon a recording medium, means for producing radio frequency impulses for energizing said relay device coincident with the production of selected one of said timing lines, and means for recording the pulse of current produced by detonation of said blasting cap.

6. A system for indicating the time break upon a seismic record which comprises, in combination, a cable having a pair of conductors connecting a shot point and a recording station, apparatus at the shot point including a resistance type Wheatstone bridge circuit incorporating a blasting cap in one arm thereof, a tube having an anode, a cathode, and a control grid, an energizing circuit for feeding blasting current to two opposite terminals of said bridge, said circuit including a generator and the anode-cathode circuit of said tube, means inductively coupling the control grid of said tube to said conductors so that said tube becomes conductive responsive to a radio frequency signal impressed upon said conductors, and means inductively coupling the other opposite terminals of said bridge to said conductors to transmit a pulse thereover when the bridge circuit is unbalanced by detonation of said blasting cap, and apparatus at the recording station including a recording galvanometer inductively coupled to said conductors, a filter for excluding radio frequency current from said galvanometer, a rotatable drum having an elongated longitudinal slot therein and a series of circumferentially spaced shorter longitudinal slots, a filament in said drum, rotation of said drum producing a series of light impulses for producing timing lines upon a seismic record, a photoelectric cell positioned to receive light from said filament only through said elongated slot, a photoelectric amplifier fed by said cell, a radio frequency oscillator for producing a radio frequency impulse upon excitation thereof by said amplifier, and means for feeding said impulse to said conductors to cause said tube at the shot point to become conductive.

7. In a recording device, in combination, a movable light-sensitive recorder tape, means for directing beams of light upon said tape to produce timing marks thereon, a photo-sensitive device, and means for focusing a selected light beam upon said device to produce a timing signal.

8. In a recording device, in combination, a movable light-sensitive recorder tape, a light source, means for focusing light produced by said source on said tape, a movable shutter device to interrupt light passing from said source to said tape, said shutter having a plurality of openings arranged in spaced formation thereon, and a light-sensitive device positioned to receive light from a selected opening but not from others of said openings.

9. In a recording device, in combination, a movable light-sensitive recorder tape, an elongated light-producing filament, means for focusing light produced by said filament on said tape to produce a transverse line thereon, a movable shutter device to interrupt light passing from said filament to said tape, said shutter having an elongated slot and a plurality of shorter slots arranged in parallel formation therein, and a light sensitive device positioned to receive light from said filament through said elongated slot but not through said shorter slots.

10. In a recording device, in combination, a movable light-sensitive recorder tape, an elongated light-producing filament, means for focusing light produced by said filament on said tape to produce a transverse line thereon, a rotatable drum surrounding said filament to interrupt light passing from said filament to said tape, said drum having an elongated longitudinal slot and a plurality of shorter longitudinal slots arranged circumferentially therearound, and a light-sensitive device positioned to receive light from said filament through said elongated slot but not through said shorter slots.

11. In a recording device, in combination, a generally cylindrical drum having a relatively wide elongated longitudinal slot and a plurality of shorter longitudinal slots of lesser width than said elongated slot arranged circumferentially therearound, an elongated filament within said drum and extending axially thereof, a movable light-sensitive recorder tape, means for reflecting light passing through said slots onto said tape to produce a succession of relatively wide timing lines, each pair of such lines having a plurality of narrow timing lines interposed therebetween, and a light-sensitive device positioned to receive light from said filament through said elongated slot but not through said shorter slots.

12. A circuit for detonating an electrically actuated blasting cap which comprises, in combination, a Wheatstone bridge of the resistance type, an electrically actuated blasting cap disposed in one arm of said bridge, a generator for producing blasting current to fire said cap, a relay having an energizing winding connected to said generator and a set of normally open contacts, a gas tube having an anode, a cathode and a control grid, leads connecting the anode-cathode circuit of said tube in series with said generator, said contacts and two opposite terminals of said bridge, whereby the tube is supplied with an anode operating potential when the relay contacts are closed by operation of said generator, means for supplying an electrical impulse to said control grid to cause said tube to become conductive, and means for withdrawing an electrical pulse from the other opposite terminals of the bridge, said pulse being produced by unbalancing of the bridge resulting from detonation of the blasting cap.

13. A circuit for detonating an electrically actuated blasting cap which comprises, in combination, an electrically actuated blasting cap, a generator for producing blasting current to fire said cap, a relay having an energizing winding connected to said generator, a set of normally open contacts, and a set of normally closed contacts connected to the terminals of said blasting cap to normally short circuit the same, a circuit closing device, leads connecting said device in series with said generator, said normally open contacts and said blasting cap, and means for supplying a control impulse to said device.

14. A circuit for detonating an electrically actuated blasting cap which comprises, in combination, a Wheatstone bridge of the resistance type, an electrically actuated blasting cap disposed in one arm of said bridge, a generator for producing blasting current to fire said cap, a relay having an energizing winding connected to said generator, a set of normally open contacts, and a set of normally closed contacts connected to the terminals of said blasting cap to normally short circuit the same, a relay tube having an anode-cathode circuit and a control grid, leads connecting the anode-cathode circuit of said tube in series with said generator, said normally open contacts and two opposite terminals of said bridge, whereby the tube is supplied with an anode operating potential when the normally open relay contacts are closed by operation of said generator, means for supplying an electrical impulse to said control grid to cause said tube to become conductive, and means for withdrawing an electrical pulse from the other opposite terminals of the bridge, said pulse being produced by unbalancing of the bridge by detonation of the blasting cap.

15. A system for indicating the time break upon a seismic record which comprises, in combination, apparatus at a shot point including an electrically actuated blasting cap, a generator for supplying blasting current to said cap, a relay device connected in circuit with said generator and said cap, said device preventing actuation of said cap when deenergized and permitting actuation of said cap when energized, and means for producing a pulse of current when said cap is detonated, and apparatus at a recording station including an optical device for producing spaced timing lines upon a recording medium, means for producing a radio frequency impulse for energizing said relay device coincident with the production of selected ones of said timing lines, a galvanometer for recording the pulse of current produced by said blasting cap, and means responsive to said pulse to disable said galvanometer after said pulse has been recorded.

16. A system for indicating the time break upon a seismic record which comprises, in combination, a cable having a pair of conductors connecting a shot point and a recording station, apparatus at the shot point including a blasting cap, a relay tube having an anode, a cathode, and a control grid responsive to radio frequency signals to cause firing of said blasting cap, means inductively coupling the control grid of said relay tube to said conductors, a circuit for producing a pulse when said blasting cap is detonated, the output of said circuit being connected to said conductors, and apparatus at a recording station including a recording galvanometer to produce a record of said pulse upon a tape, a filter connecting said galvanometer to said conductors and eliminating radio frequency current from the galvanometer circuit, means for producing spaced timing lines upon said recording medium, means for producing radio frequency pulses coincident in time with certain of said timing lines, and means for feeding the radio frequency pulses thus produced to said conductors.

17. A system for indicating the time break upon a seismic record which comprises, in combination, apparatus at a shot point including an electrically actuated blasting cap, a generator for supplying blasting current to said cap, a relay device connected in circuit with said generator and said cap, said device preventing actuation of said cap when deenergized and permitting actuation of said cap when energized, and means for producing a pulse of current when said cap is detonated, and apparatus at a recording station including an optical device for producing spaced timing lines upon a recording medium, means for producing a radio frequency impulse for energizing said relay device coincident with the production of selected ones of said timing lines, a galvanometer for recording the pulse of current produced by said blasting cap, and means responsive to said pulse to connect said galvanometer in a seismic recording circuit after said pulse has been recorded.

18. A system for indicating the time break upon a seismic record which comprises, in combination, means for producing spaced timing lines upon a recording medium, means for producing an impulse of light coincident in time with the production of certain of said timing lines, an electrically actuated blasting cap, means for producing blasting current for detonating said cap, a photoelectric cell positioned to receive said light impulses, a photoelectric amplifier fed by said cell, a radio frequency oscillator for producing a radio frequency impulse upon excitation thereof by said amplifier, means responsive to amplified impulses to supply said blasting current to said cap, means for producing an electrical pulse when said cap is detonated, and means for recording said pulse upon said medium.

19. A system for detonating a blasting cap which comprises, in combination, means for producing spaced timing lines upon a recording medium, a radio frequency oscillator, means for exciting said oscillator to produce radio frequency impulses coincident in time with the production of selected ones of said timing lines, a generator, a blasting cap, a relay device connected in circuit with said generator and cap, said device preventing actuation of said cap when deenergized and permitting actuation of said cap when energized, and means for feeding said radio frequency impulses to said relay device to effect energization thereof.

(References on following page)

References Cited in the file of this patent

UNITED STATES PATENTS

| Number | Name | Date |
|---|---|---|
| 2,060,206 | Hammond, Jr. | Nov. 10, 1936 |
| 2,313,091 | Renner | Mar. 9, 1943 |
| 2,404,553 | Wales | July 23, 1946 |
| 2,424,622 | McClure | July 29, 1947 |
| 2,470,846 | De Boisblanc et al. | May 24, 1949 |
| 2,496,392 | Hasbrook | Feb. 7, 1950 |
| 2,536,327 | Tolsoh | Jan. 2, 1951 |
| 2,545,474 | Kurland et al. | Mar. 20, 1951 |

FOREIGN PATENTS

| Number | Country | Date |
|---|---|---|
| 143,488 | Great Britain | Jan. 20, 1921 |